United States Patent
Dang et al.

(12)

(10) Patent No.: US 12,066,277 B1
(45) Date of Patent: Aug. 20, 2024

(54) PYROTECHNIC LATCH RETRACTION MECHANISM

(71) Applicant: VIETTEL GROUP, Ha Noi (VN)

(72) Inventors: Xuan Doan Dang, Ha Noi (VN); Tien Hoa Nguyen, Vinh Phuc Province (VN); Doan Hung Nguyen, Ha Noi (VN)

(73) Assignee: VIETTEL GROUP, Ha Noi (VN)

( * ) Notice: Subject to any disclaimer, the term of this patent is extended or adjusted under 35 U.S.C. 154(b) by 0 days.

(21) Appl. No.: 18/433,239

(22) Filed: Feb. 5, 2024

(30) Foreign Application Priority Data

Feb. 28, 2023 (VN) ............................... 1-2023-01272

(51) Int. Cl.
*F42B 3/00* (2006.01)
*B64C 1/00* (2006.01)
*F15B 15/19* (2006.01)

(52) U.S. Cl.
CPC ................ *F42B 3/006* (2013.01); *B64C 1/00* (2013.01); *F15B 15/19* (2013.01)

(58) Field of Classification Search
CPC ............. F42B 3/006; B64C 1/00; F15B 15/19
USPC ........................................................... 60/636
See application file for complete search history.

(56) References Cited

U.S. PATENT DOCUMENTS

| 2,749,063 | A * | 6/1956 | Low | B64D 1/06 |
| | | | | 294/82.26 |
| 2,780,961 | A * | 2/1957 | Musser | F15B 15/19 |
| | | | | 60/636 |
| 6,568,184 | B2 * | 5/2003 | Blackburn | C06D 5/06 |
| | | | | 60/636 |
| 2006/0213191 | A1* | 9/2006 | Borg | F15B 15/19 |
| | | | | 60/512 |
| 2012/0234162 | A1* | 9/2012 | Tirmizi | F42B 3/006 |
| | | | | 89/1.14 |

* cited by examiner

*Primary Examiner* — Hoang M Nguyen
(74) *Attorney, Agent, or Firm* — patenttm.us

(57) ABSTRACT

The invention refers to a pyrotechnic latch retraction mechanism that can be applied to various types of flying devices. The main structure of this mechanism includes piston-cylinder assembly, electric ignition assembly and guide assembly. The solution described in this invention not only makes the exploitation, use and preservation of equipment more convenient, reduces difficulties, prevents risks and saves costs, but also ensures safety and security, reliability during device operation.

19 Claims, 1 Drawing Sheet

PYROTECHNIC LATCH RETRACTION MECHANISM

THE TECHNICAL FIELD OF THE INVENTION

The invention proposes a pyrotechnic latch retraction mechanism. In detail, the mechanism mentioned in the invention is applied in the military and aerospace field.

The Technical Status of the Invention

Currently, besides the small and medium-sized aircrafts that are widely used in the world in both civil and military fields, there are also special types with large or very large sizes and wide operating ranges. That means the wing parts (elevator or stabilizer wings) of these devices are also large in size; causing difficulties, risks, and costs during exploitation, use and preservation.

The Technical Nature of the Invention

The purpose of the invention is that a pyrotechnic latch retraction mechanism is used in the military field, aerospace field, in particular in systems requiring high reliability, fast start-up times, convenience during exploitation, use and preservation.

In this invention, the mechanism retracts the latch to release the wing before as it rotates during the operation of the device. This latch will fix the wing in the folded state, contributing to reducing the overall size of the product system without affecting its performance, bringing great economic and technical benefits during using and preserve the equipment of the manufacturer as well as the units using it.

In this invention, the mechanism operates upon the activation of a pyrotechnic-activated component synchronized with the device. In addition, this mechanism can also be activated by a stream of compressed air. However, in the aerospace field, pyrotechnic-activated devices offer high reliability and faster response times during work. Therefore, this invention proposes a mechanism for retracting the latch using pyrotechnics that simultaneously meets the requirements of technology, manufacturing ability and practical application.

To achieve the above purposes, the invention proposes a latch retraction mechanism consisting of the following main assemblies:

Piston-cylinder assembly: includes piston pin, cylinder, rubber gaskets (two gaskets) and pin. This is an actuator assembly that holds the wing of an aircraft in a folded state and releases the wing before it rotates.

Electric igniter assembly: includes mounting bracket and electric igniter. It has the effect of creating a stream of combustion products from the pyrotechnic powder of the electric igniter to create pressure to push the piston pin to move and release the wings of the flying device.

Guide assembly: includes guide tube, housing and bushing. It not only has the effect of guiding the movement of the piston pin when the mechanism operates but also acts as a movement limiter and holds the piston pin tightly at the end of the stroke position.

DETAILED DESCRIPTION OF THE INVENTION

Figure 1:
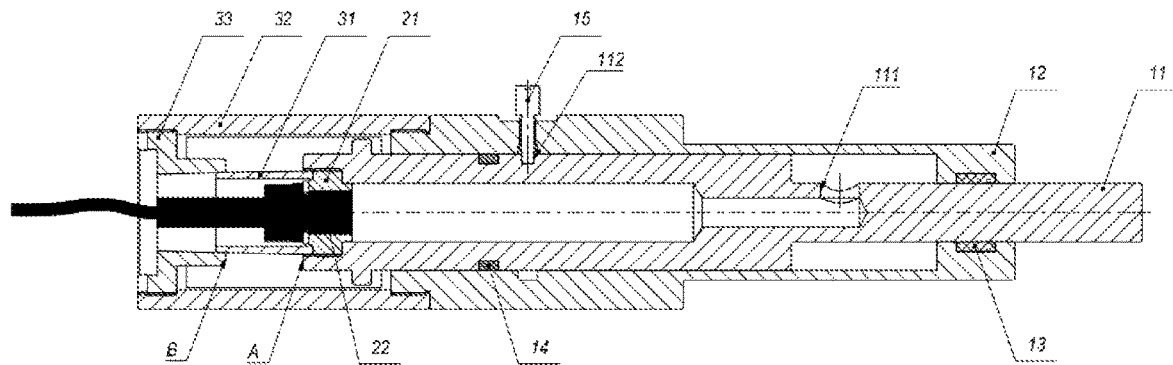
FIG. 1 illustrates the structure of the pyrotechnic latch retraction mechanism.
Figure 2:
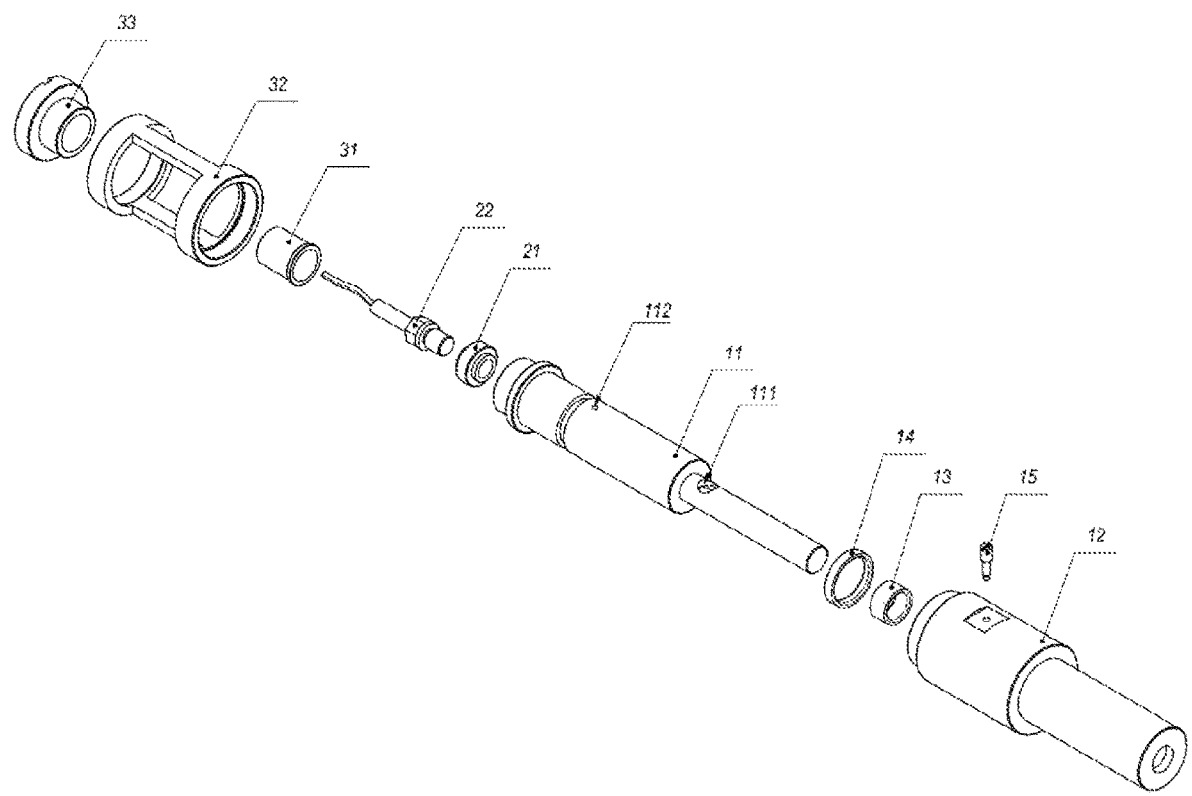
FIG. 2 illustrates the 3D drawing of the parts in the pyrotechnic latch retraction mechanism.

Refer to FIG. 1 and FIG. 2, the drawing illustrates the structure of the pyrotechnic latch retraction mechanism. This mechanism includes a piston-cylinder assembly, an electric ignition assembly and a guide assembly. Wherein:

The piston-cylinder assembly includes the following parts: piston pin 11, cylinder 12, first rubber gasket 13, second rubber gasket 14 and pin 15. More specifically:

Piston pin 11 is the part that directly holds the device's wings in a folded state. It has a step-shaped cylinder and a stepped hole inside to make a path for the flow of combustion product gas when the electric igniter is activated. The first part of the stepped hole is threaded to connect to the mounting bracket 21. On the body of the piston pin 11, there are two holes drilled perpendicular to the stepped hole. The first hole 111 is machined to connect with the stepped hole at the final position to create a path for the flow of combustion product gases to escape to cylinder 12. The second hole 112 is a smooth cylindrical hole used to fit pin 15 and positioning between the piston pin 11 and cylinder 12. According to working requirements, piston pin 11 has to meet the following requirements: have high mechanical strength, must not react with the pyrotechnics of electric igniters, be resistant to corrosion, and be precision mechanical machined. The roughness of the outer surface of the part in contact with cylinder 12 is not greater than Ra1.25 because this surface will be assembled and move relative to the inner surface of cylinder 12 during the operation of the mechanism. If this roughness value is greater than Ra1.25, it will reduce the assembly precision between piston pin 11 and cylinder 12, causing the friction force between the two surfaces to increase, increasing the wear of the two parts, and affecting the operability of the structure as well as reduces the stability of the device. Therefore, priority is given to choosing stainless steel as the material to manufacture this part.

Cylinder 12 is the part that acts as the chamber containing the combustion product gas flow, has a stepped cylindrical shape, and the inner surface is machined into a smooth cylindrical hole. On the outer surface of the cylinder body, there is a flat milled surface to facilitate the machining of threaded holes to install pin 15. The position of the threaded hole on the cylinder body and the position of the smooth cylindrical hole (second hole 112) on the piston pin 11 is calculated depending on the specific requirements of each device to ensure the latch retraction mechanism works with the correct function. According to working requirements, cylinder 12 must meet the following requirements: have high mechanical strength, must not react with the pyrotechnics of electric igniters, be resistant to corrosion, and be precisely mechanically machined with the inner surface roughness not greater than Ra1.25 because this surface will be assembled and in contact with the outer surface of the piston pin 11 during the operation of the mechanism. If this roughness value is greater than Ra1.25, it will reduce the assembly precision between cylinder 12 and piston pin 11, leading the friction force between the two surfaces to increase, and increasing the abrasion of the two parts. This will affect the operability of the structure as well as reduce the stability of the device. Therefore, priority is given to choosing stainless steel as the material to manufacture this part.

The first rubber gasket 13 and the second rubber gasket 14 are two parts used to ensure tightness for the latch retraction mechanism. The first rubber gasket 13 is assembled into the groove on the cylinder body 12, and the second rubber gasket 14 is assembled into the groove on the piston pin 11. According to working conditions, the material chosen to make the gaskets is high-grade. heat-resistant rubber.

Pin 15 is a part used to locate and fix the relative position between piston pin 11 and cylinder 12 before this mechanism operates. Pin 15 is structured like a threaded screw, the head is smooth cylindrical to fit with the hole on the piston pin body 11 (hole 112), and the body is threaded to fit with the cylinder body. According to working requirements, the material chosen to manufacture this pin will have a lower hardness than the hardness of the material used to manufacture the piston pin 11. Therefore, priority is given to choosing C45 steel or SUS304 steel as the material to create this part.

The electric igniter assembly includes the following parts: mounting bracket 21 and electric igniter 22.

The mounting bracket 21 is the part used to assembly the electric igniter 22 and is connected to the piston-cylinder assembly with a threaded joint. The mounting bracket has a stepped cylindrical axial cross-section, with threads on both outer and inner surfaces. The external thread is used to assemble with cylinder 12, the internal thread is used to assemble with electric igniter 22. On the front surface of the mounting bracket 21 towards the bushing 33, two symmetrical grooves are machined to create a position for placing a tool used to assemble or disassemble the mounting bracket 21 with cylinder 12. Because there are no special requirements, the material chosen to make this part is regular steel that has been treated to prevent oxidation and corrosion like carbon steel. Even if there are special requirements for the overall weight of this mechanism, an alternative manufacturing material can be chosen such as aluminium or aluminium alloy and then anodized to ensure the hardness of the part.

The electric igniter 22 contains a pyrotechnic dose inside to create a flow of combustion product gas that causes the piston pin 11 to move inside cylinder 12. Within the scope of the invention, the detailed calculations of the dosage and composition of the igniter will not be presented. The electric igniter 22 is considered a synchronous part with the latch retraction mechanism. However, the general structure of an electric igniter usually consists of three main parts: housing (with threaded head to connect to the mounting bracket); the pyrotechnic dose is a composition of potassium perchlorate (KClO4), aluminium powder (Al) and additives with the dosage of ingredients calculated according to the specific requirements for the pressure of the combustion product gas stream to be created and working conditions of the mechanism.

The guide assembly includes the following parts: guide tube 31, housing 32 and bushing 33.

Guide tube 31 has a smooth cylindrical inner surface. The outer surface is tapered and precisely machined with a roughness no greater than Ra1.25 to ensure that when the piston pin moves, the guide tube fits and adheres tightly to the bushing 33. The outer surface also has threads at the top that connect to the piston pin. The material of the guide tube 31 is stainless steel.

Housing 32 is a tubular rotating part, with two symmetrical technological cavities cut out through the axial plane through the centre of the part, both ends have internal threads to connect with cylinder 12 and bushing 33. The material of the housing 32 is C45 steel or SUS304 steel.

Bushing 33 acts as a limiter for the piston pin 11 and holds the piston pin 11 tightly at the end of the stroke. This part has a circular shape, the outer surface is threaded to connect with the housing 32, the inner surface is tapered with a taper angle corresponding to the guide tube 31 and is precision mechanical machined with roughness no greater than Ra1.25. On the front side, towards the threaded connection, two symmetrical grooves are also machined to create a location for placing the tool to disassembly or assembly bushing 33 with housing 32. The material for manufacturing bushing 33 is stainless steel.

With the above structure, the pyrotechnic latch retraction mechanism operates as follows:

When the aircraft control system provides an activation electrical signal, the electric igniter 22 will operate through the electrical connector to the system on the device. The pyrotechnic dose inside the electric igniter 22 will burn and create a stream of combustion product gases, this gas flow will follow the path inside the piston pin 11 to escape and fill the empty space in cylinder 12. Under the pressure created by the combustion product gas flow, piston pin 11 tends to move backwards but is held by pin 15. When the thrust created by the gas pressure is large enough, it will break pin 15. Piston pin 11 will continue to move backwards and at the same time be gradually withdrawn from the fixed position until the wing of the aircraft in a folded state is completely released before rotation. At this time, surface A of the piston pin will contact surface B of the bushing 33 and the outer surface of the housing 32 fits tightly with the inner surface of the bushing 33 due to the friction force between the two conical surfaces, prevents the piston pin 11 from moving in the opposite direction after the electric igniter 22 has been activated, therefore avoiding affecting the subsequent operation of the device.

The invention is described in detail as above. However, clearly that to the person of ordinary skill in the field of invention is not limited to the variant described in the invention description. An invention can be made in a modified or altered mode that is not outside the invention scope defined by the points of claim protection. Therefore, what is described in the invention description is for illustrative purposes only, and will not impose any restrictions on the invention.

What is claimed is:

1. A pyrotechnic latch retraction mechanism for a device with wings, including a piston-cylinder assembly, an electric igniter assembly and a guide assembly, Wherein:

the piston-cylinder assembly: includes a piston pin, a cylinder, a first rubber gasket, a second rubber gasket and a pin:

the piston pin is the part that directly holds the device's wings in a folded state, the piston-cylinder assembly has a step-shaped cylinder and a stepped hole inside the piston-cylinder assembly to make a path for a flow of combustion product gas when an electric igniter of the electric igniter assembly is activated, a first part of the stepped hole is threaded to connect to a mounting bracket, on a body of the piston pin, there are first and second holes drilled perpendicular to the stepped hole, the first hole is machined to connect with the stepped hole at a final position to create a path for the flow of combustion product gases to escape to the cylinder, the second hole is a smooth cylindrical hole used to fit pin and positioning between the piston pin and cylinder;

the cylinder acts as a chamber containing the combustion product gas flow, has a stepped cylindrical shape, and an inner surface that is machined into a smooth cylindrical hole, on an outer surface of the cylinder body, there is a flat milled surface to facilitate the machining of threaded holes to install the pin wherein a position of the threaded hole on the cylinder body and a position of the smooth cylindrical second hole on the piston pin is calculated depending on specific requirements of the device to ensure the latch retraction mechanism works correctly;

the first rubber gasket and the second rubber gasket are to ensure tightness for the latch retraction mechanism, the first rubber gasket is assembled into a groove on the cylinder body, and the second rubber gasket is assembled into a groove on the piston pin;

the pin is used to locate and fix a relative position between the piston pin and the cylinder before operation;

the electric igniter assembly includes the following parts: the mounting bracket and the electric igniter;

the mounting bracket carries the electric igniter and is connected to the piston-cylinder assembly with a threaded joint, the mounting bracket has a stepped cylindrical axial cross-section, with threads on both outer and inner surfaces, the threads on the outer surface are used to assemble with cylinder, the threads on the inner surface are used to assemble with the electric igniter;

the electric igniter contains a pyrotechnic dose inside to create a flow of combustion product gas on ignition that causes the piston pin to move inside cylinder the guide assembly includes a guide tube, a housing and a bushing;

the guide tube has a smooth cylindrical inner surface and tapered outer surface, when the piston pin moves, the guide tube fits and adheres tightly to the bushing, the outer surface also has threads at the top that connect to the piston pin; the housing is a tubular rotating part, with two symmetrical cavities cut out through an axial plane through a centre thereof, having internal threads at two ends to connect with the cylinder and the bushing; the bushing acts as a limiter for the piston pin and holds the piston pin tightly at the end of a stroke and has a circular shape, an outer surface is threaded to connect with the housing, an inner surface is tapered with a taper angle corresponding to the guide tube.

2. The pyrotechnic latch retraction mechanism according to claim 1, wherein the piston pin comprises a material that is non-reactive with the pyrotechnics of the electric igniter.

3. The pyrotechnic latch retraction mechanism according to claim 2, wherein the roughness of an outer surface of the piston pin is not greater than Ra1.25.

4. The pyrotechnic latch retraction mechanism according to claim 2, wherein the piston pin comprises stainless steel.

5. The pyrotechnic latch retraction mechanism according to claim 1, wherein the cylinder comprises a material that is non-reactive with the pyrotechnics of the electric igniter.

6. The pyrotechnic latch retraction mechanism according to claim 5, wherein the roughness of an inner surface of the cylinder is not greater than Ra1.25.

7. The pyrotechnic latch retraction mechanism according to claim 5, wherein the cylinder comprises stainless steel.

8. The pyrotechnic latch retraction mechanism according to claim 1, wherein the first rubber gasket and the second rubber gasket comprise high-grade heat-resistant rubber.

9. The pyrotechnic latch retraction mechanism according to claim 1, wherein on a front surface of the mounting bracket towards the bushing, two symmetrical grooves are machined to create a position for placing a tool to be used to assemble or disassemble the mounting bracket with cylinder.

10. The pyrotechnic latch retraction mechanism according to claim 1, wherein the mounting bracket comprises steel that has been treated to prevent oxidation or aluminium or aluminium alloy that has been anodized.

11. The pyrotechnic latch retraction mechanism according to claim 1, wherein the pyrotechnic dose is a composition of potassium perchlorate ($KClO_4$), aluminium powder (Al) and additives with dosage of ingredients calculated according to requirements for the pressure of combustion product gas stream to be created.

12. The pyrotechnic latch retraction mechanism according to claim 1, wherein the guide tube has a smooth cylindrical inner surface and a tapered outer surface.

13. The pyrotechnic latch retraction mechanism according to claim 1, wherein the guide tube has a roughness no greater than Ra1.25.

14. The pyrotechnic latch retraction mechanism according to claim 1, wherein the guide tube has an outer surface with threads at the top that connect to the piston pin.

15. The pyrotechnic latch retraction mechanism according to claim 1, wherein the guide tube comprises stainless steel.

16. The pyrotechnic latch retraction mechanism according to claim 1, wherein the housing comprises C45 steel or SUS304 steel.

17. The pyrotechnic latch retraction mechanism according to claim 1, wherein the bushing has a roughness no greater than Ra1.25.

18. The pyrotechnic latch retraction mechanism according to claim 1, wherein the bushing, on a front side, towards the threaded connection, has two symmetrical grooves machined to create a location for placing a tool to disassemble or assemble the bushing with the housing.

19. The pyrotechnic latch retraction mechanism according to claim 1, wherein the bushing comprises stainless steel.

* * * * *